Figure 1:
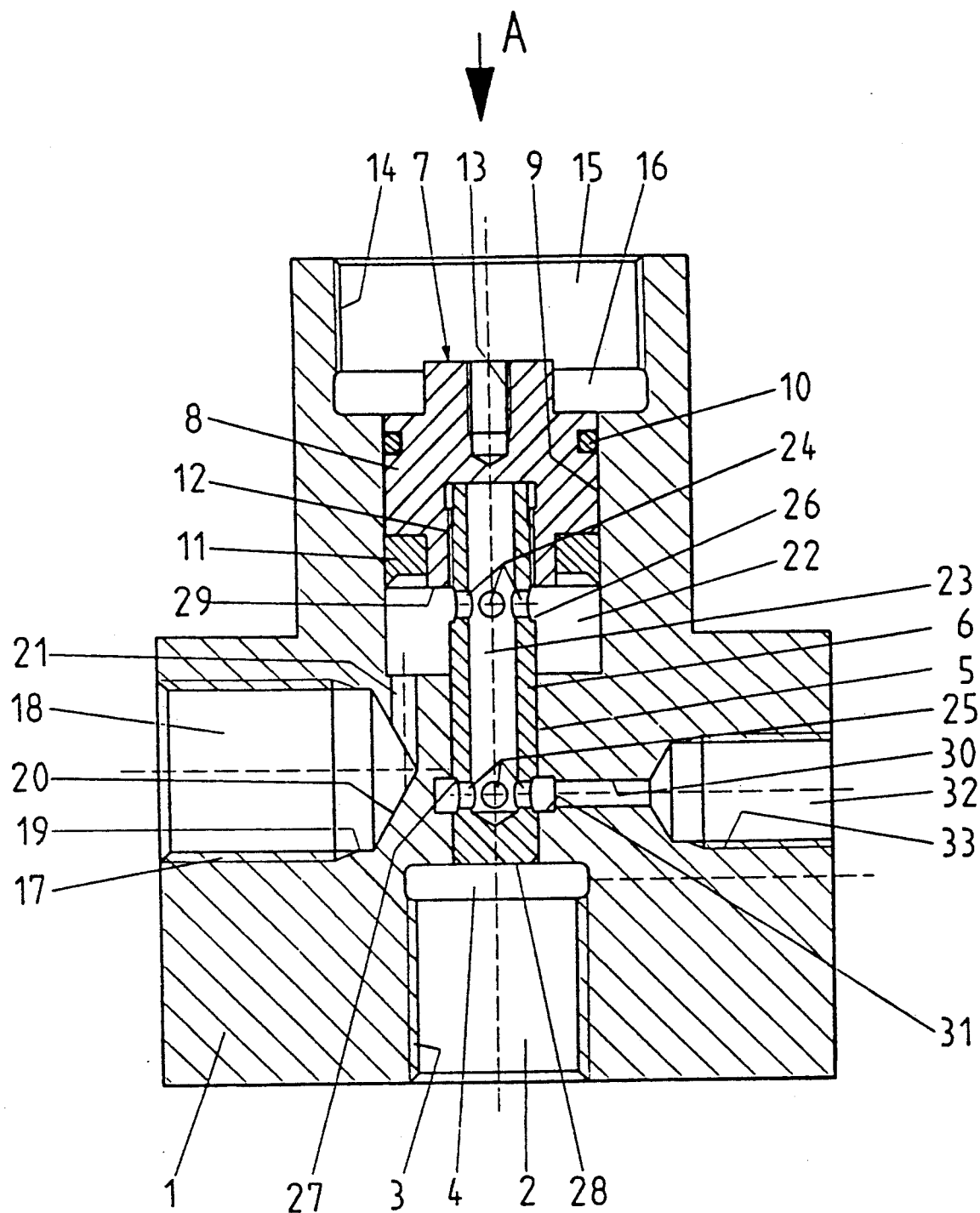

United States Patent [19]

Schiefer

[11] Patent Number: 5,255,701

[45] Date of Patent: Oct. 26, 1993

[54] HYDRAULIC PRESSURE REGULATOR

[76] Inventor: Rolf Schiefer, Arnoldstrasse 14, D-4050 Mönchengladbach 2, Fed. Rep. of Germany

[21] Appl. No.: 917,039

[22] PCT Filed: Dec. 2, 1991

[86] PCT No.: PCT/DE91/00971

§ 371 Date: Jul. 30, 1992

§ 102(e) Date: Jul. 30, 1992

[87] PCT Pub. No.: WO92/10799

PCT Pub. Date: Jun. 25, 1992

[30] Foreign Application Priority Data

Dec. 13, 1990 [DE] Fed. Rep. of Germany ... 9016844[U]

[51] Int. Cl.$^5$ .............................................. G05D 16/10
[52] U.S. Cl. ................................................... 137/116.3
[58] Field of Search ..................................... 137/116.3

[56] References Cited

U.S. PATENT DOCUMENTS 1,361,636  12/1920  Stage ........................... 137/116.3

FOREIGN PATENT DOCUMENTS 22862    3/1964  Japan ............................ 137/116.3
1383842  2/1975  United Kingdom ........... 137/116.3

Primary Examiner—Robert G. Nilson
Attorney, Agent, or Firm—Mason, Kolehmainen, Rathburn & Wyss

[57] ABSTRACT

Described is a hydraulic pressure regulator with automatic self-relief. A control piston disposed in a regulator housing between an inlet pressure chamber and an outlet pressure chamber for a hydraulic medium is adapted to be doubly acted upon. The inlet pressure of the hydraulic medium to be regulated on the one hand and a resilient control pressure force on the other hand act on the control piston. The control piston has on its side towards the inlet pressure a smaller piston surface on a lower projecting piston part and a larger piston surface provided on an upper piston part. The lower piston part has a flow duct for the hydraulic medium, which opens beneath the larger piston surface into an upper annular groove of the control piston and which opens into a lower annular groove at the lower piston part laterally at a spacing relative to the smaller piston surface. Upon a reduction in the resilient control pressure force the control piston is moved into a position in which the flow duct is closed relative to the inlet pressure chamber. At the same time a pressure relief chamber for the hydraulic medium obtaining on the outlet side of the control piston is opened. With the hydraulic pressure regulator, when the medium ceases to be taken off out of the outlet pressure chamber the pressure in the outlet pressure chamber can be reduced or brought to zero.

5 Claims, 2 Drawing Sheets

HYDRAULIC PRESSURE REGULATOR

The invention relates to a hydraulic pressure regulator comprising a control piston disposed in a regulator housing between an inlet pressure chamber and an outlet pressure chamber for a hydraulic medium.

Hydraulic pressure regulators are used primarily to convert fluctuating inlet pressures into a constant outlet pressure. The areas of use in that respect are for example the application of liquid adhesives in the packaging industry or the application of paint or other coating agents. When the medium ceases to be taken off at the outlet pressure chamber, when therefore for example the application of glue or the application of paint is terminated or interrupted by the operator, the outlet pressure last occurring fully obtains in the outlet pressure chamber. That gives rise to various disadvantages:

If for example closure of the applicator nozzle which is usually connected to the outlet pressure chamber for the application of paint, glue or the like is not completely sealing, medium issues from the nozzle in an uncontrolled fashion as a result of the pressure in the outlet pressure chamber. Furthermore there are agents which react in an undesirable manner under the influence of pressure. Thus it may happen for example that, with many glues, undesirable hardening occurs as a result of the pressure which obtains in the outlet pressure chamber and in the system connected thereto, to and including the injection nozzle. In the case of so-called plastisols, the situation may involve for example a separation-out phenomenon, that is to say the previously homogeneous mixture of substances is separated into individual components and can no longer be used in that condition.

Another disadvantage is that, with a pressure obtaining in the outlet pressure chamber and the system connected thereto, it is not possible to carry out any maintenance operations or repairs as otherwise the outlet pressure obtaining could possibly result in the medium being abruptly discharged in an uncontrolled fashion.

The invention is based on the object of so designing a hydraulic pressure regulator of the kind set forth in the opening part of this specification that, when the medium ceases to be taken off from the outlet pressure chamber, the pressure in the outlet pressure chamber can be reduced as desired and - if desired - can be reduced to zero. In that respect, the invention seeks to take account of the requirements which occur in a practical context, whereby for example there is no need to provide for pressure relief in the event of a short-term cessation in the medium being taken off, as in that case the above-discussed adverse consequences normally do not occur, but that when for example the medium is to cease to be taken off for a longer period of time, the desired reduction in pressure or complete elimination of pressure is or can be effected.

There are no pressure regulators which, with a relatively constant inlet pressure, permit stepless pressure regulation with automatic self-relief. The design of known hydraulic pressure regulators of the kind set forth in the opening part of this specification is highly expensive and complicated. For that reason the known pressure regulators are relatively heavily dependent on repair and expensive to manufacture. A further part of the object of the present invention is that of proposing a hydraulic pressure regulator of the kind set forth in the opening part of this specification, which is of a simple structure and therefore robust, inexpensive to manufacture and maintenance-friendly but which at the same time has an advantageous regulation characteristic.

In accordance with the invention those objects are attained in that the control piston is adapted to be doubly acted upon and the inlet pressure of the hydraulic medium to be regulated acts on the control piston on the one side and a resilient control pressure force acts on the control piston on the other side and that the control piston, on its side towards the inlet pressure, has a smaller piston surface which is provided on a lower projecting piston part and which is directly towards the inlet pressure medium and a larger piston surface which is provided on an upper piston part, and the lower piston part has a flow duct for the hydraulic medium, which opens beneath the larger piston surface into an upper annular groove in the control piston and which opens at the lower piston part into a lower annular groove laterally at a spacing relative to the smaller piston surface, and that when the resilient control pressure force is reduced the control piston is moved into a position in which the flow duct is closed relative to the inlet pressure chamber and at the same time a pressure relief chamber for the hydraulic medium obtaining on the outlet side of the control piston is opened.

The co-operation of the pressure force in the inlet pressure chamber and the resilient control pressure force which opposes that pressure force results in an advantageous regulation characteristic, the configuration which is provided in accordance with the invention, of the control piston with the laterally opening flow duct, also contributing in that respect. The hydraulic pressure regulator according to the invention is of a relatively simple structure and therefore maintenance-friendly and inexpensive.

When the resilient control pressure force is reduced, the control piston is moved upwardly by the action of the inlet pressure force so that the chamber disposed beneath the larger piston surface is increased in size. As that chamber is in direct communication with the outlet pressure chamber, that means that the volume on the outlet side is increased and thereby the outlet pressure is decreased or reduced to zero. By varying the magnitude of the resilient control pressure force therefore it is possible to determine the pressure in the outlet pressure chamber and reduce it to a value of zero. Adjustment of the resilient control pressure force can be effected for example manually by actuation of a spindle with a compression spring or for example by way of a diaphragm cylinder.

An accurate regulation characteristic on the part of the hydraulic pressure regulator is achieved by the control piston being moved in the longitudinal direction in dependence on the inlet pressure force in the inlet pressure chamber or the resilient control pressure force respectively predominating. A through flow of the medium is possible only insofar as the lower annular groove in the control piston is opened and the medium can flow through the flow duct by way of the upper annular groove into the outlet pressure chamber. If the inlet pressure chamber predominates over the resilient control pressure force, the control piston is correspondingly moved upwardly until the annular groove has left the inlet pressure chamber and therefore no further medium can flow through.

In a further configuration according to the invention, it can be provided that, for opening of the pressure relief chamber, the laterally opening lower end of the flow duct in the lower piston part is brought into communication with a pressure relief duct. That is effected upon a corresponding reduction in the resilient control pressure force. The medium which issues from the outlet pressure chamber until the pressure is completely reduced can be returned by way of the pressure relief duct in a suitable fashion. It is desirable if accumulating vessels such as for example elastic hoses etc are arranged at the outlet side in an adjoining system.

It can also be provided that for the control piston there is an abutment for holding same in the position in which the flow duct is communicated with the pressure relief duct. By virtue of such an abutment which can also be adapted to be adjustable or displaceable, it is possible to operate with two adjustable outlet pressures, with an unaltered inlet pressure.

In a further configuration of the invention, it can be provided that the lower piston part, in its region between the smaller piston surface and the lower annular groove, is of a smaller diameter than in its remaining region, so that it is possible to provide for circulation of the inlet medium by way of the pressure relief duct. That is appropriate for example when the hydraulic medium is glues which in a stoppage condition harden or separate out (referred to as a yoghurt effect).

Figure 2:
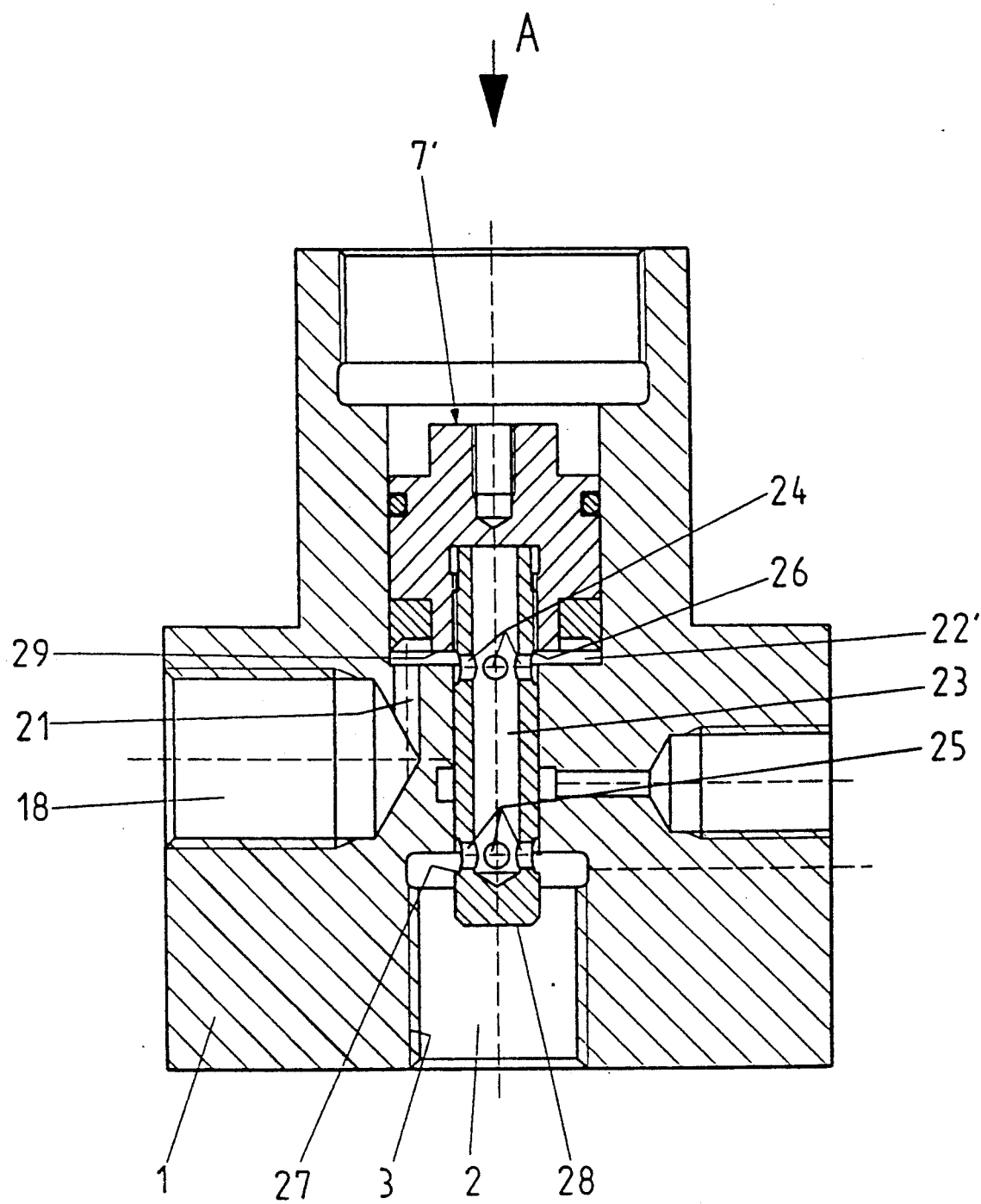

The invention is described in greater detail hereinafter by means of the embodiment illustrated in the accompanying drawings in which:

FIG. 1 is a diagrammatic view in longitudinal section through an embodiment of a hydraulic pressure regulator according to the invention, and FIG. 2 is a view corresponding to FIG. 1 but in which the control piston is in the operative position or regulating position.

The hydraulic pressure regulator shown in the drawings has a housing 1. Provided in the housing 1 is an inlet pressure chamber 2 with a diagrammatically illustrated connection screwthread 3 for the connection for example of a hose screw coupling for the feed of a hydraulic medium from for example a piston pump (not shown). A termination region for the screwthread 3 is identified by reference numeral 4. Connected to the inlet pressure chamber 2 is a guide bore 5 which is provided in the housing 1 for a lower piston part 6 of a control piston which is generally identified by reference numeral 7. Besides the lower piston part 6, the control piston 7 has an upper piston part 8 which is guided slidably in a cylindrical recess 9 in the housing 1. The upper piston part 8 of the control piston 7 has piston seals 10 and 11 which are arranged in corresponding recesses in the upper piston part 8. The lower piston part 6 is screwed to the upper piston part 8 by way of a screwthread 12. A screwthreaded bore 13 only serves to be able to remove the control piston for example upon dismantling from the housing 1. The housing 1 has an upper recess 15 which is provided with a screwthread 14 and into which can be screwed a 'resilient control pressure force' (not shown). That may be for example a diaphragm cylinder or the like. In that way, a resilient control pressure force can be applied in the direction indicated by the arrow A to the end, which is the upper end in the drawing, of the upper piston part 8 of the control piston 7. A turned-out recess disposed beneath the screwthread 14 is identified by reference numeral 16. The housing 1 also has an outlet pressure chamber 18 provided with an internal screwthread 17. The termination region of the screwthread 17 is identified by reference numeral 19. The outlet pressure chamber 18 communicates by a conical region 20 with a communicating bore 21, by means of which a communication is made between the outlet pressure chamber 18 and the chamber 22 beneath the upper piston part 8. The entire outlet pressure chamber is therefore formed by the actual outlet pressure chamber 18, the communicating bore 21 and the chamber 22.

In its interior the lower piston part 6 of the control piston 7 has a through-flow duct 23. The through-flow duct 23 communicates by way of transverse bores 24 and 25 respectively with an upper annular groove 26 and a lower annular groove 27 respectively in the piston part 6.

The lower piston part 6 has a piston surface 28 which is towards the inlet pressure chamber 2 and the upper piston part 8 has a piston surface 29 which is towards the hydraulic pressure medium. In the illustrated embodiment, the piston surface 28 is a circular piston surface and the piston surface 29 is an annular piston surface. The piston surface 28 is smaller than the piston surface 29.

As can be seen, the flow duct 23 opens beneath the larger piston surface 29. The lower annular groove 27 into which the flow duct 23 also opens is arranged at a spacing relative to the smaller piston surface 28.

In addition, provided in the housing 1 is a pressure relief duct which is identified by reference numeral 30 and which opens into an annular groove 31 in the housing. At the opposite end the pressure relief duct 30 opens into a connecting bore 32 with a screwthread 33.

An abutment for limiting the displacement travel of the control piston 7, which is possible upwardly in the view shown in the drawing, is formed for by an abutment being screwed into the screwthread 14. That may also be the element with which the resilient control force is applied.

The view shown in FIG. 2 differs from that shown in FIG. 1 only in that the control piston 7 is moved downwardly relative to the view shown in FIG. 1. For that reason the control piston in FIG. 2 is identified by reference numeral 7' in that Figure.

The mode of operation of the hydraulic pressure regulator is as follows:

A hydraulic medium which is under pressure is fed to the inlet pressure chamber 2. The pressure is generated for example by a piston pump and is therefore subject to pressure fluctuations at the switch-over point. The function of the hydraulic pressure regulator is inter alia to ensure that the fluctuations in pressure are compensated for, in the outlet pressure chamber 18. Connected to the outlet pressure chamber 18 is a system (not shown) which ends for example in an applicator nozzle for a medium to be applied.

The inlet pressure force of the hydraulic medium acts on the control piston 7 from below, in the view shown in the drawing, while the resilient control pressure force acts 'from above' in the direction indicated by the arrow A. In the position of the control piston 7 shown in FIG. 1, the control piston has been displaced upwardly into its upper limit position by the action of the inlet pressure force. In that position there is a communication between the outlet pressure chamber 18, the communicating bore 21 and the chamber 22 by way of the groove 26, the transverse bores 24, the flow duct 23, the transverse bores 25, the annular groove 27 and the annular groove 31, with the pressure relief duct 30. In that position the outlet pressure chamber 18 is relieved of pressure. A through flow of the hydraulic medium obtaining in the inlet pressure chamber 2 is not possible.

That is a position in which maintenance operations can be carried out, nozzles can be changed or the like, in the system connected to the outlet pressure chamber. If the nozzle outlet opening should be leaking, no medium escapes. If the lower piston part 6, in its region between the smaller piston surface 28 and the lower annular groove 27, is of a smaller diameter than in the rest of its region (not shown), then circulation of the hydraulic medium can take place in that position, insofar as hydraulic medium from the inlet pressure chamber 2 can pass through the annular gap which is thus present into the annular groove 27 or 31 and from there can issue through the pressure relief duct 30 and the connection 32 and can circulate. The magnitude of the control pressure force which acts in the direction indicated by the arrow A in that condition is zero.

If the control piston assumes the position 7' shown in FIG. 2, that occurs due to the action of the resilient control pressure force acting in the direction indicated by the arrow A on the upper end of the control piston. In order to reach the position 7' of the control piston, that force must be greater than the inlet pressure force acting on the smaller piston surface 28, in the inlet pressure chamber. When the position 7' is reached, hydraulic medium flows out of the inlet pressure chamber 2 by way of the annular groove 27, the transverse bores 25, the flow duct 23, the transverse bores 24 and the annular groove 26 into the chamber, identified by reference numeral 22' in FIG. 2, beneath the larger piston surface 29. From there the medium can pass by way of the communicating bore 21 into the outlet pressure chamber 18. It is assumed that the pressure of the inlet medium in the inlet pressure chamber 2 is always greater than the resilient control pressure force. When the control piston is in the position 7', the pressure of the inlet medium acts not only on the smaller piston surface 28 but also on the larger piston surface 29 so that the effective piston surface area provided in that position is greater than in position 7. That provides on the one hand that a pressure can build up in the outlet pressure chamber 18, more specifically in accordance with the set magnitude of the resilient control pressure force. On the other hand, that provides that the control piston is moved upwardly, more specifically to such an extent that the flow of the medium through the annular groove 27 is blocked. In that position pressure obtains both in the inlet pressure chamber 2 and also in the outlet pressure chamber 18. If hydraulic medium is taken off from the outlet pressure chamber 18, the pressure in the outlet pressure chamber falls. As a result the pressure acting 'upwardly' on the larger piston surface 29 decreases. As, in that position, the pressure force in the inlet pressure chamber, is only still acting on the smaller piston part 28, the resilient control pressure force in the direction indicated by the arrow A then predominates, which means that the control piston is moved downwardly and the annular groove 27 is partially or entirely opened. That again permits a through-flow of medium and the above-described procedure is continuously repeated. Pressure regulation therefore takes place by virtue of a continuous upward and downward movement of the control piston.

Thus, upon a reduction in the resilient control pressure force, the pressure in the outlet pressure chamber is reduced. If the resilient control pressure force is entirely removed, the control piston 7 moves into the position which is shown in FIG. 1 and in which a pressure relief chamber for the hydraulic medium obtaining on the outlet side of the control piston is opened. Either the chamber 22 or the chamber 22 and in addition thereto the pressure relief duct 30 can be considered as the pressure relief chamber.

I claim:

1. A hydraulic pressure regulator comprising a control piston disposed in a regulator housing comprising a control piston disposed in a regulator housing between an inlet pressure chamber and an outlet pressure chamber for a hydraulic medium, characterised in that the control piston (7) is adapted to be doubly acted upon and the inlet pressure of the hydraulic medium to be regulated acts on the control piston (7) on the one hand and a resilient control pressure force (A) acts on the control piston (7) on the other hand, and that the control piston (7), on its side towards the inlet pressure, has a smaller piston surface (28) which is proved on a lower projecting piston part (6) and which is directly towards the inlet pressure medium and a larger piston surface (20) which is provided on an upper piston part (8), and the lower piston part (6) has a flow duct (23) for the hydraulic medium, which opens beneath the larger piston surface (29) into an upper annular groove (26) in the control piston and which opens into a lower annular groove (27) at the lower piston part (6) laterally at a spacing relative to the smaller piston surface (28), and that upon a reduction in the resilient control pressure force (A) the control piston (7) is moved into a position in which the flow duct (23) is closed off relative to the inlet pressure chamber (2) and at the same time fluid pressure of the hydraulic medium obtaining in a relief chamber 22 on the outlet side of the control piston (7) adjacent the large piston surface (29) is released.

2. A hydraulic pressure regulator according to claim 1 characterised in that the opening of the pressure relief chamber the laterally opening lower end of the flow duct (23) in the lower piston part (6) is brought into communication with a pressure relief duct (30).

3. A hydraulic pressure regulator according to claim 1 characterised in that provided for the control piston (7) is an abutment for holding it in the position in which the flow duct (23) is communicated with the pressure relief duct (30).

4. A hydraulic pressure regulator according to claim 1 characterised in that when the resilient control pressure force (A) is removed the control piston (7) is moved by the pressure of the hydraulic medium, which acts on the smaller piston surface (28), in such a way that the chamber (22) beneath the larger piston surface (29) is enlarged so that said chamber can act as a pressure relief chamber.

5. A hydraulic pressure regulator according to claim 2 characterised in that the lower piston part (6), in its region between the smaller piston surface (28) and the lower annular groove (27), is of a smaller diameter than in its remaining region, so that circulation of the hydraulic medium in the inlet pressure chamber (2) is possible by way of the pressure relief duct (30).

* * * * *

UNITED STATES PATENT AND TRADEMARK OFFICE
CERTIFICATE OF CORRECTION

PATENT NO. : 5,255,701

DATED : October 26, 1993

INVENTOR(S) : ROLF SCHIEFER

It is certified that error appears in the above-identified patent and that said Letters Patent is hereby corrected as shown below:

Column 6, line 23, delete "proved" and substitute therefor --provided--.

Signed and Sealed this

Twelfth Day of April, 1994

Attest:

BRUCE LEHMAN

*Attesting Officer*     *Commissioner of Patents and Trademarks*